US008048478B2

(12) United States Patent
Hirokawa et al.

(10) Patent No.: US 8,048,478 B2
(45) Date of Patent: Nov. 1, 2011

(54) METHOD OF MANUFACTURING ELECTRODE FOR ELECTROCHEMICAL DEVICE

(75) Inventors: Yoshitsugu Hirokawa, Tokyo (JP); Hidekazu Mori, Tokyo (JP); Masahiro Yamakawa, Tokyo (JP)

(73) Assignee: Zeon Corporation, Tokyo (JP)

( * ) Notice: Subject to any disclaimer, the term of this patent is extended or adjusted under 35 U.S.C. 154(b) by 140 days.

(21) Appl. No.: 12/504,842

(22) Filed: Jul. 17, 2009

(65) Prior Publication Data

US 2010/0015328 A1    Jan. 21, 2010

Related U.S. Application Data

(63) Continuation of application No. 10/546,736, filed as application No. PCT/JP2004/002102 on Feb. 24, 2004, now abandoned.

(30) Foreign Application Priority Data

Feb. 25, 2003  (JP) .................................. 2003-047119
Jul. 3, 2003    (JP) .................................. 2003-190789

(51) Int. Cl.
*B05D 5/12*    (2006.01)

(52) U.S. Cl. ........................................ 427/79; 29/25.03
(58) Field of Classification Search .................... 427/79; 29/25.03
See application file for complete search history.

(56) References Cited

U.S. PATENT DOCUMENTS

| 3,288,641 | A   |   | 11/1966 | Rightmire       |         |
|-----------|-----|---|---------|-----------------|---------|
| 4,696,872 | A   |   | 9/1987  | Blanchart et al.|         |
| 4,775,455 | A   | * | 10/1988 | Chandramouli et al. | 204/294 |
| 5,985,488 | A   |   | 11/1999 | Mitate et al.   |         |
| 6,031,712 | A   | * | 2/2000  | Kurihara et al. | 361/502 |
| 6,072,692 | A   | * | 6/2000  | Hiratsuka et al.| 361/502 |
| 6,198,621 | B1  | * | 3/2001  | Saito et al.    | 361/502 |
| 6,627,252 | B1  |   | 9/2003  | Nanjundiah et al.|        |
| 6,730,440 | B1  | * | 5/2004  | Bauer et al.    | 429/249 |
| 2002/0028389 | A1 | * | 3/2002  | Sonoda et al.  | 429/324 |
| 2003/0202316 | A1 |   | 10/2003 | Kawasato et al.|         |
| 2004/0246658 | A1 | * | 12/2004 | Adrianov et al.| 361/508 |

FOREIGN PATENT DOCUMENTS

| JP | 63-107011 A | 5/1988 |
|----|-------------|--------|
| JP | 02-235320 A | 9/1990 |
| JP | 4-112454 A  | 4/1992 |
| JP | 6-196364 A  | 7/1994 |
| JP | 8-250380 A  | 9/1996 |
| JP | 09-036005 A | 2/1997 |
| JP | 11-135379 A | 5/1999 |
| JP | 11-162794 A | 6/1999 |

(Continued)

OTHER PUBLICATIONS

Office Action issued in U.S. Appl. No. 10/546,736, dated Oct. 22, 2007.
Office Action issued in U.S. Appl. No. 10/546,736, dated May 22, 2008.
Office Action issued in U.S. Appl. No. 10/546,736, dated Sep. 22, 2008.

(Continued)

*Primary Examiner* — Michael Cleveland
*Assistant Examiner* — Tabassom Tadayyon Eslami
(74) *Attorney, Agent, or Firm* — Birch, Stewart, Kolasch & Birch, LLP

(57) ABSTRACT

A method of manufacturing an electrode for an electrochemical device is provided with the steps of: supplying, onto a collector, a powdered mixture containing a binder and an active material; and heating the powdered mixture to form an electrode layer on the collector, that allows continuous mass production of electrodes for electrochemical devices.

20 Claims, 2 Drawing Sheets

FOREIGN PATENT DOCUMENTS

| | | |
|---|---|---|
| JP | 2000-030712 A | 1/2000 |
| JP | 2000-48807 A | 2/2000 |
| JP | 2001-351616 A | 12/2001 |
| JP | 2002-33105 A | 1/2002 |
| JP | 2002-56896 A | 2/2002 |
| JP | 2002-117899 A | 4/2002 |
| JP | 2003-045432 A | 2/2003 |
| JP | 2003-045493 A | 2/2003 |

OTHER PUBLICATIONS

Office Action issued in U.S. Appl. No. 10/546,736, dated Jan. 8, 2009.

Japanese Office Action dated Jun. 1, 2010 issued in corresponding Japanese Patent Application No. 2005-502875.

Machine translation of JP 2001-351616 A, published Dec. 21, 2001.

* cited by examiner

METHOD OF MANUFACTURING ELECTRODE FOR ELECTROCHEMICAL DEVICE

This application is a Continuation Application of application Ser. No. 10/546,736 filed on Aug. 24, 2005, now abandoned and for which priority is claimed under 35 U.S.C. §120 and which claims the priority of PCT/JP2004/002102, filed on Feb. 24, 2004. This application also claims priority under 35 U.S.C. §119 of Application Nos. JP 2003-047119 and JP 2003-190789, filed in Japan on Feb. 25, 2003 and Jul. 3, 2003, respectively. The entire contents of all references are hereby incorporated by reference.

FIELD OF THE INVENTION

The invention relates to a method of manufacturing an electrode for an electrochemical device.

BACKGROUND OF THE INVENTION

Recently, with the developments in electronic instruments, there has been a demand for development of compact, lightweight, high-energy-density, rechargeable electrochemical devices. In particular, there has been an expansion in the use of high-energy-density lithium-ion secondary batteries and long-life, high-current-producible electric double layer capacitors and redox capacitors, because of their advantages.

Recently, there has been a drastic increase in the demand for electric double layer capacitors serving as memory-backup power sources, which use an electric double layer formed on an interface between a polarized electrode and an electrolyte. Attention for electric double layer capacitors has also been focused on large-capacitance-demanding applications such as electric vehicle power sources.

In the fields of cellular phones, laptop computers and the like, there has been a sharp increase in the demand for lithium-ion secondary batteries using $LiCoO_2$, $LiNiO_2$, $LiMn_2O_4$, or the like as a positive electrode active material and graphite or the like as a negative electrode active material, because of their performance. In addition, attention has been focused on the capacity size of redox capacitors using oxidation-reduction reaction (pseudo-capacitance of electric double layer) on the surface of metal oxides or electrically conductive polymers.

These electrochemical devices have been practically developed for the last dozen years or so, and many patent applications and literatures on these techniques have been published in recent years. For example, methods of manufacturing electrodes for electric double layer capacitors are proposed which include kneading activated carbon powder with a solvent of a liquid electrolyte such as sulfuric acid to form a slurry and forming the slurry by pressing (U.S. Pat. No. 3,288,641). However, the electrode formed by this method has a rigid porous structure and can easily crack or collapse. Thus, it cannot endure long-term use.

In order to produce electrodes having anti-cracking or anti-collapsing properties and good form retention, it is proposed that the method of manufacturing electrodes should include preforming a kneaded product of a carbonaceous material such as activated carbon, a binder such as polytetrafluoroethylene (PTFE) and a liquid lubricant and then drawing or rolling the preform into a sheet-shaped product (Japanese Patent Application Laid-Open (JP-A) No. S63-107011 and JP-A No. H02-235320).

In this method including the kneading step, however, PTFE can be partially formed into fibers and partially not formed into fibers. In the process of forming a thin film-shaped electrode sheet, therefore, uneven surfaces can be easily formed, and thus performance of the resulting electrochemical device can be unsatisfactory.

There is also proposed a method including the steps of mixing activated carbon powder, PTFE and a solvent to form a paste, applying the paste to a collector, drying it, then heating it to the melting point of PTFE or higher, and press-forming it to form a thin-film electrode and to increase its density (JP-A No. H09-36005). However, this method has complicated processes.

There is also proposed a method including the steps of mixing activated carbon powder, an aqueous dispersion of a styrene/butadiene polymer and a water-soluble thickening binder to form a paste, applying the paste to a collector, drying it, and then press-forming it to form a thin-film electrode and to increase its density (JP-A No. H11-162794). In this method, however, the viscosity of the slurry highly depends on the solid content, and thus a slight increase in slurry concentration can lead to a great change in slurry viscosity. Therefore, the coating performance can easily be degraded, and continuous production is not possible by this method.

As mentioned above, it is difficult to achieve continuous production by any of the conventional manufacturing methods, and for example, a long electrode sheet cannot be efficiently produced. The conventional methods have a problem with mass production.

The invention has been made in order to solve the problems with the above prior art, and it is an object of the invention to provide a method of manufacturing an electrode for electrochemical device suitable for industrial-scale mass production.

SUMMARY OF THE INVENTION

The inventors have made active investigations on processes for manufacturing electrodes for electrochemical devices such as lithium-ion secondary batteries and electric double layer capacitors. As a result, the inventors have found that electrodes for an electrochemical device can be efficiently manufactured by a simplified process including the steps of using a powdered mixture containing a binder and an active material, supplying the mixture onto a collector by spreading or any other method and heating the mixture to form an electrode layer, and finally have made the invention.

Thus, the invention is directed to a method of manufacturing an electrode for an electrochemical device, comprising the steps of: supplying, onto a collector, a powdered mixture containing a binder and an active material; and heating the powdered mixture to form an electrode layer on the collector.

Preferably, the electrochemical device is an electric double layer capacitor, and the active material is a carbonaceous material.

The powdered mixture may further contain an electroconductivity-imparting agent.

When the electrochemical device is an electric double layer capacitor, 100 parts by weight of the powdered mixture preferably contains 0.1 to 50 parts by weight of the binder and 50 to 99.9 parts by weight of a carbonaceous material for use as the active material and the electroconductivity-imparting agent. Herein the term "carbonaceous material" may encompass the "active material" for use as an electrode material and the "electroconductivity-imparting agent" as described later.

The binder preferably contains at least one of particulate rubber and particulate thermoplastic elastomer.

The binder also preferably contains particulate rubber and particulate thermoplastic elastomer.

The thermoplastic elastomer is preferably a graft polymer of an ethylene/acrylic (or methacrylic) ester copolymer graft polymerized radical-polymerizable monomer thereon.

The binder preferably has a particle diameter of 0.01 to 10 μm.

The powdered mixture is preferably further press-formed under heating or after heating.

DETAILED DESCRIPTION OF THE INVENTION

<1> Material Components

Figure 1:
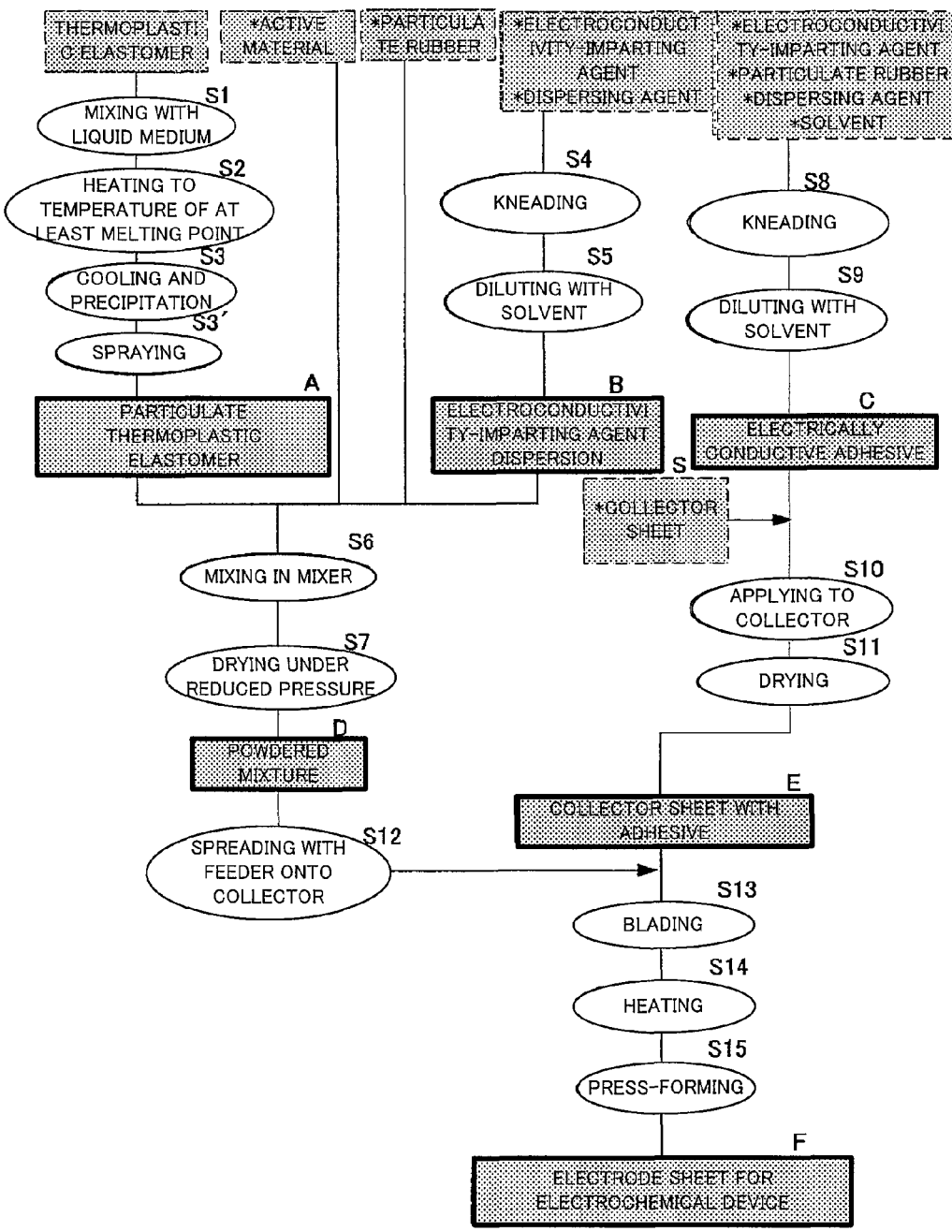
FIG. 1 is a flow chart showing a manufacturing method according to the invention.

According to the invention, there is provided a method of manufacturing an electrode for an electrochemical device, comprising the steps of: supplying, onto a collector, a powdered mixture containing a binder and an active material; and heating the powdered mixture. In the method of the invention, "the binder" and "the active material" are used as essential components of the powdered mixture, and "the electroconductivity-imparting agent" is used as an optional component, which are described below.

(1) Binder

The binder for use in the invention can be melted or softened by heat to bond the active material to the collector. The type of the binder may be rubber, thermoplastic elastomer, or the like. In particular, the binder for use in the invention preferably contains "particulate rubber" and/or "particulate thermoplastic elastomer."

<Rubber>

Any rubber may be used as the binder. Examples of the rubber include diene rubbers mainly composed of a conjugated diene-derived monomer unit such as butadiene and isoprene; acrylic rubbers mainly composed of an acrylic acid ester- and/or methacrylic acid ester-derived monomer unit; and fluorocarbon rubbers. Diene rubbers and acrylic rubbers are particularly preferred. Particulate diene rubbers having a crosslinked structure and particulate acrylic rubbers having a crosslinked structure are more preferred. Particulate diene rubbers can be produced by adjusting the polymerization conditions such as polymerization temperature, the amount of a polymerization initiator, and the amount of a chain transfer agent. Particulate acrylic rubbers can be produced by copolymerizing an acrylic acid ester and/or a methacrylic acid ester, a multifunctional ethylenically unsaturated monomer and optionally any other monomer.

Examples of the acrylic acid ester include ethyl acrylate, propyl acrylate, isopropyl acrylate, n-butyl acrylate, isobutyl acrylate, tert-butyl acrylate, n-amyl acrylate, isoamyl acrylate, n-hexyl acrylate, 2-ethylhexyl acrylate, hexyl acrylate, nonyl acrylate, lauryl acrylate, stearyl acrylate, hydroxyethyl acrylate, and hydroxypropyl acrylate.

Examples of the methacrylic acid ester include ethyl methacrylate, propyl methacrylate, isopropyl methacrylate, n-butyl methacrylate, isobutyl methacrylate, tert-butyl methacrylate, n-amyl methacrylate, isoamyl methacrylate, n-hexyl methacrylate, 2-ethylhexyl methacrylate, octyl methacrylate, isodecyl methacrylate, lauryl methacrylate, tridecyl methacrylate, stearyl methacrylate, hydroxyethyl methacrylate, and hydroxypropyl methacrylate.

Examples of the monomer copolymerizable with the acrylic acid ester and/or the methacrylic acid ester include aromatic vinyl compounds such as styrene, α-methylstyrene, 2-methylstyrene, 3-methylstyrene, and 4-methylstyrene; α,β-unsaturated nitrile compounds such as acrylonitrile and methacrylonitrile; ethylenically unsaturated carboxylic acids such as acrylic acid, methacrylic acid, itaconic acid, fumaric acid, and maleic acid; acrylamide compounds such as acrylamide and methacrylamide; and sulfonic acid group-containing monomers such as acrylamidemethylpropanesulfonic acid and styrenesulfonic acid, and salts thereof.

Examples of the multifunctional ethylenically unsaturated monomer include ethylene glycol dimethacrylate, diethylene glycol dimethacrylate, polyethylene glycol polymethacrylate, trimethylolpropane trimethacrylate, and divinylbenzene.

Examples of the diene rubbers include polybutadiene, optionally carboxy-modified styrene/butadiene copolymer, and acrylonitrile/butadiene copolymer and hydrogenated product thereof.

Examples of the acrylic rubbers include 2-ethylhexyl acrylate/methacrylic acid/acrylonitrile/ethylene glycol dimethacrylate copolymer, 2-ethylhexyl acrylate/methacrylic acid/methacrylonitrile/diethylene glycol dimethacrylate copolymer, butyl acrylate/acrylonitrile/diethylene glycol dimethacrylate copolymer, and butyl acrylate/acrylic acid/trimethylolpropane trimethacrylate copolymer.

The particulate rubber may be kept in the form of particles when used in the preparation of the powdered mixture. Preferably, the particulate rubber is dispersed in a liquid medium and used in the form of a liquid dispersion. The liquid dispersion may be an aqueous dispersion or an organic solvent dispersion. In view of environmental considerations, the aqueous dispersion is preferred. In the liquid dispersion, the particulate rubber generally has a particle diameter of 0.01 to 10 μm, preferably of 0.05 to 1 μm. Using such particulate rubber, adhesion of the active material to the collector can be enhanced, and the total consumption of the binder can be reduced.

<Thermoplastic Elastomer>

In the method of the invention, a thermoplastic elastomer that is not adhesive at or around room temperature can keep the powdered mixture in a powder state and then can function as an active binder component similarly to the above rubber after heat treatment. Such a thermoplastic elastomer is preferably used in the form of particles.

The thermoplastic elastomer for use is generally a copolymer having partly a crystal structure in its molecule. Specific examples of the thermoplastic elastomer for use in the invention include acrylic (or methacrylic) ester copolymers such as ethylene/methyl acrylate copolymer, ethylene/methyl methacrylate copolymer, ethylene/ethyl acrylate copolymer, and ethylene/ethyl methacrylate copolymer; acrylic (or methacrylic) acid copolymer such as ethylene/acrylic acid copolymer and ethylene/methacrylic acid copolymer; graft polymers such as any of the above acrylic (or methacrylic) ester copolymers graft polymerized by radical-polymerizable monomer thereon; and styrene-containing block copolymers such as styrene/butadiene/styrene block copolymer, styrene/isoprene/styrene block copolymer, styrene/ethylene-butylene/styrene block copolymer, and styrene/ethylene-propylene/styrene block copolymer.

Among the above thermoplastic elastomers, the graft polymer of an ethylene/acrylic (or methacrylic) ester copolymer graft polymerized radical-polymerizable monomer thereon is preferably used. For example, such a graft polymer comprises an ethylene/ethyl acrylate copolymer graft polymerized by methyl methacrylate, acrylonitrile, methacrylic acid or the like.

Any method may be used to form particulate thermoplastic elastomer. For example, a method for use in producing particulate thermoplastic elastomer includes dissolving the thermoplastic elastomer in a liquid medium at a temperature of at its melting point or higher and then cooling the solution to precipitate particles in the liquid medium. In such a particle preparation method, a dispersing agent, an emulsifier or the like may be used as needed. Alternatively, a liquid dispersion of the thermoplastic elastomer may be spray-dried to form a powder of particles before use. The particle diameter of the thermoplastic elastomer is generally from 0.01 to 10 μm, preferably from 0.02 to 5.0 μm.

The particulate thermoplastic elastomer is preferably used in combination with the particulate rubber. The blend ratio of particulate rubber/particulate thermoplastic elastomer is generally from 1/10 to 10/1, preferably from 2/5 to 5/2. At a particulate rubber/particulate thermoplastic elastomer blend ratio of at least 1/10, a reduction in adhesion of the active material to the collector can be prevented. If the blend ratio is 10/1 or less, coalescence between the active material and the particle of electroconductivity-imparting agent as described later can be prevented, so that a reduction in performance of electrochemical devices can be prevented.

<Dispersing Agent>

In the invention, water- or organic solvent-soluble polymers may be used as dispersing agents for the electroconductivity-imparting agent as described later. Any of the above particulate rubbers or particulate thermoplastic elastomers may be used as the dispersing agent as long as they are water- or organic solvent-soluble.

Examples of the water-soluble polymer include celluloses such as carboxymethylcellulose (CMC), methylcellulose and ethylcellulose, polyvinyl alcohol, polyvinyl methyl ether, polyacrylic acid or its salt, oxidized starch, phosphorylated starch, casein, and various types of modified starch.

The organic solvent-soluble polymer should satisfy the requirements: (1) it should be soluble in a solvent; (2) it should be insoluble in a liquid electrolyte for use in capacitors; and (3) it should be electrochemically stable in the liquid electrolyte for use in capacitors. Examples complying with the requirements include acrylonitrile polymers such as polyacrylonitrile, acrylonitrile/acrylic acid ester copolymers, and acrylonitrile/methacrylic acid ester copolymers; and fluoropolymers such as polyvinylidene fluoride.

The water- or organic solvent-soluble polymer is preferably used in the kneading step (see Step S4 in FIG. 1) for producing electroconductivity-imparting agent dispersion B as described later. It can provide fluidity and viscosity to the electroconductivity-imparting agent when used in the kneading step. It is preferably added in an amount of 1 to 5% by weight, more preferably of 1 to 3% by weight, relatively to the electroconductivity-imparting agent. If the amount of the dispersing agent is too small, the viscosity of the electroconductivity-imparting agent can be insufficient in the kneading step, and kneading can be insufficient. If the amount of the dispersing agent is too large, the internal resistance can easily be increased.

<Amount of Blended Binder>

In the manufacturing method of the invention, the binder is generally used in a total amount of 0.1 to 50 parts by weight, preferably of 2 to 30 parts by weight, in order to form 100 parts by weight of the powdered mixture.

If the amount of the binder is too small, it can be difficult to form the powdered mixture into the shape of a sheet by heating, pressing or the like. If the amount of the binder is too large, the internal resistance of the electrochemical device can be high.

(2) Active Material

The active material on which electrolyte ions will be adsorbed in electric double layer capacitors may comprise activated carbon, polyacene, or the like and is preferably a powder with a specific surface area of at least 30 $m^2/g$, preferably of 200 to 3500 $m^2/g$. Fibers or powders such as carbon fibers, carbon whiskers, and graphite, having specific surface areas within the above range, may also be used as far as they does not degrade the extrusion formability. The activated carbon may be phenol-, rayon-, acryl-, pitch-, or coconut husk-derived activated carbon. The materials disclosed in JP-A Nos. 11-317333 and 2002-25867 such as non-porous carbon comprising graphite-like microcrystalline carbon having an expanded distance between the microcrystalline carbon phases may also be used as the electrode active material. The active material preferably has a particle diameter of 0.1 to 100 μm, more preferably of 1 to 20 μm, because in such a case, electrodes for use in capacitors can easily be produced in the form of thin films, and high capacitance densities can be obtained.

Examples of positive electrode active materials for use in lithium-ion secondary batteries include lithium-containing composite metal oxides such as $LiCoO_2$, $LiNiO_2$, $LiMnO_2$, $LiMn_2O_4$, $LiFePO_4$, and $LiFeVO_4$; transition metal sulfides such as $TiS_2$, $TiS_3$ and amorphous $MoS_3$; and transition metal oxides such as $Cu_2V_2O_3$, amorphous $V_2O$—$P_2O_5$, $MoO_3$, $V_2O_5$, and $V_6O_{13}$. Electrically-conductive polymers such as polyacetylene and poly(p-phenylene) may also be used. Examples of negative electrode active materials include carbonaceous materials such as amorphous carbon, graphite, natural graphite, meso carbon micro beads (MCMB), and pitch-derived carbon fibers; and electrically conductive polymers such as polyacene.

The active material for use in redox capacitors may be a metal oxide such as ruthenium oxide ($RuO_2$).

(3) Electroconductivity-Imparting Agent

In the invention, a carbonaceous material such as acetylene black, ketjen black and carbon black is optionally used as the electroconductivity-imparting agent in mixture with the active material. Preferably, any of these electroconductivity-imparting agents is dispersed in the form of fine particles with the above dispersing agent and then mixed with the above active material. The electroconductivity-imparting agent used in combination can significantly improve the electrical contact between the active material matters so that the electrochemical devices can have low internal resistance and high capacitance density.

The carbonaceous material (including the active material and the electroconductivity-imparting agent) for forming an electric double layer capacitor is generally used in an amount of 50 to 99.9 parts by weight, preferably of 70 to 98 parts by weight, more preferably of 80 to 96 parts by weight, to form 100 parts by weight of the powdered mixture. Concerning the blend ratio of the active material with the electroconductivity-imparting agent, generally 0.1 to 20 parts by weight, preferably 2 to 10 parts by weight of the electroconductivity-imparting agent is blended with 100 parts by weight of the active material.

In the case of a positive electrode for lithium-ion batteries, the electroconductivity-imparting agent is generally used in an amount of 1 to 20 parts by weight, preferably of 2 to 10 parts by weight, to form 100 parts by weight of the powdered mixture. In the case of a negative electrode for lithium-ion batteries, the carbonaceous material (including the active material and the electroconductivity-imparting agent) is generally used in an amount of 50 to 99.9 parts by weight, preferably of 70 to 98 parts by weight, to form 100 parts by weight of the powdered mixture. The blend ratio of active material/electroconductivity-imparting agent is generally from 200/1 to 5/1, preferably from 100/1 to 10/1.

<2> Manufacturing Flow and Manufacturing Apparatus

Figure 2:
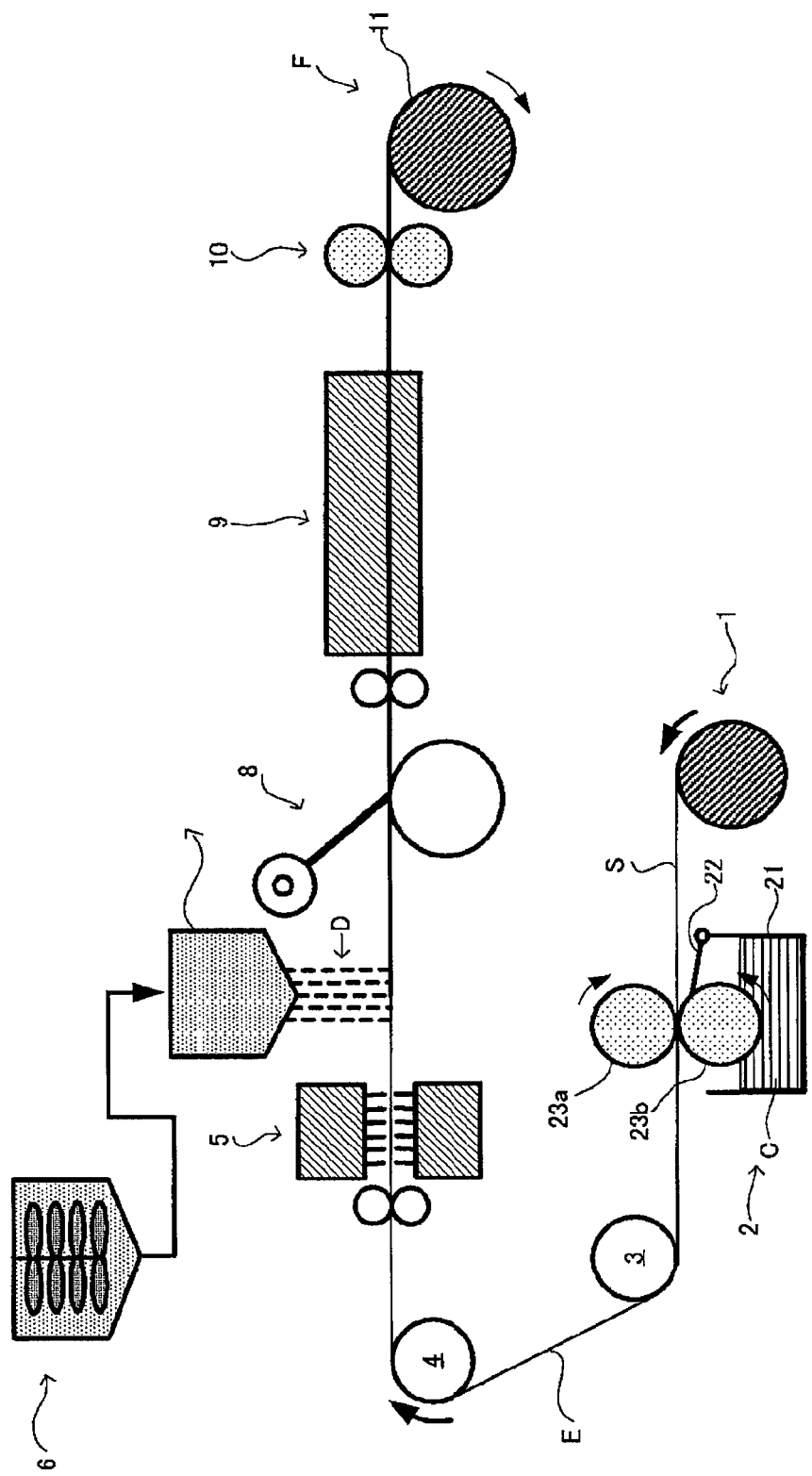
FIG. 2 is a schematic diagram showing a manufacturing apparatus for use in a manufacturing method according to the invention.

An example of the method of manufacturing electrodes for electrochemical devices according to the invention is described with reference to FIG. 1 showing a manufacturing method flow and FIG. 2 schematically showing a manufacturing apparatus. While the manufacturing method flow and the manufacturing apparatus are designed to be applied to the production of electrodes for electric double layer capacitors, the method of manufacturing electrodes for electrochemical devices according to the invention may also be applied to make electrodes for any other electrochemical devices such as lithium-ion secondary batteries and redox capacitors.

In this embodiment, the manufacturing method include first mixing and dissolving the thermoplastic elastomer in a liquid medium (step S1), then heating the liquid mixture to a temperature of at least the melting point of the thermoplastic elastomer (step S2), and performing precipitation by cooling (step S3) to form particulate thermoplastic elastomer A, which may be used in the form of a dispersion in a liquid medium. If necessary, the precipitate of thermoplastic elastomer A may be recovered and dried by any known method such as spraying (step S3') before use.

Concurrently, the electroconductivity-imparting agent (e.g. acetylene black), one of the carbonaceous materials for forming an electrode layer, and the dispersing agent (e.g. an aqueous solution of carboxymethylcellulose) are kneaded (step S4) and then diluted with any properly selected solvent (step S5) to form an electroconductivity-imparting agent dispersion B.

The prepared particulate thermoplastic elastomer A, electroconductivity-imparting agent dispersion B, a carbonaceous active material other than the electroconductivity-imparting agent (e.g. activated carbon), and the particulate rubber are mixed in a mixer 6 (see FIG. 2) such as a kneader (step S6). The mixture is dried under reduced pressure (step S7) to give a powdered mixture D for forming an electrode layer.

If necessary, the manufacturing method of the invention may include the steps of kneading the electroconductivity-imparting agent, the particulate rubber, the dispersing agent, and a solvent (step S8), and diluting them with any properly selected solvent (step S9) to form an electrically conductive adhesive C, which may be used to bond an electrode layer to the collector. Specifically, the electrically conductive adhesive C is applied to a collector sheet S using a coating apparatus 2 (step S10). A specific amount of the electrically conductive adhesive C is stored in an adhesive tank 21 such that the adhesive C can easily be applied (see FIG. 2). The adhesive tank 21 is equipped with a set of rolls 23a and 23b, and the lower portion of the lower roll 23b is dipped in the adhesive. When the rolls are rotated, the electrically conductive adhesive C deposited on the surface of the roll 23b is lifted up, scraped and adjusted with a blade 22 to have a specific amount, and then transferred and applied to the lower surface of the collector sheet S.

The collector sheet E coated with the electrically conductive adhesive C is turned around by means of drive rolls 3 and 4 and allowed to pass through an optionally provided drying oven 5 to be dried (step S11).

A feeder 7 loaded with the powdered mixture D is placed above the collector sheet E passing through the drying oven 5. A specific amount of the powdered mixture D is fed (spread) onto the upper surface of the collector sheet E from the lower port of the feeder 7 (step S12). The powdered mixture D deposited on the upper surface of the collector sheet E is then leveled off with a blade 8 (step S13).

The collector sheet E is subsequently introduced into a heating apparatus 9, in which the temperature is kept at the melting point of the thermoplastic elastomer A or higher, for example, at 200° C. In the process of heating the powdered mixture D, the particulate thermoplastic elastomer in the mixture is melted to form an electrode layer comprising the carbonaceous materials (the electroconductivity-imparting agent and the active material) bonded with the elastomer (step S14). In this process, the particulate rubber, which is an additive in the powdered mixture, also plays a role of a binder together with the thermoplastic elastomer.

The collector sheet E having the formed electrode layer is rolled through a pair of press rolls 10 under heating or after heating (step S15). The press-forming step is preferably used, because the resulting electrode can have improved adhesion and a uniform surface.

The collector sheet E having the formed electrode layer is wound up on a take-up roll 11 to give an electrode sheet F for use in electrochemical devices. The sheet is then cut or formed into the desired shape for use as an electrochemical device electrode. After the step of cutting or the like, vacuum drying is preferably performed to remove residual water, solvent or the like from the electrode sheet. For example, vacuum drying is performed under the conditions of a temperature of 200° C., an atmospheric pressure of $6.7 \times 10^4$ Pa and a holding time of 7 hours.

Using the above process, a long high-capacitance-density electrode sheet for use in electrochemical devices can continuously be manufactured in a stable manner. It should be noted that the steps of preparing, applying and drying the electrically conductive adhesive C (steps S8 to S11) are not essential. The powdered mixture D may be heated through a pre-heated collector without using the heating apparatus 9.

<3> Specific Mode of the Manufacturing Method (1) Mixing Method

The powdered mixture for use in the invention may be produced by uniformly mixing the binder and the active material and optionally the electroconductivity-imparting agent in a mixer 6 (see FIG. 1, step S6, and FIG. 2). The mixer may be a ribbon mixer, a co-kneader, an internal mixer (Banbury mixer), a two-arm kneader, a paddle mixer, a self-cleaning type kneader, a screw extruder, a screw kneader, a Henschel mixer, a planetary mixer, a Muller mill, an Eirich mill, a chaser mill, or the like.

The binder may be used in a dried state but is preferably subjected to mixing in the form of a dispersion in a liquid medium so that the binder-containing liquid can be applied in the form of a coating film around the electroconductivity-imparting agent and around the active material and that the binder can be uniformly dispersed together with the electroconductivity-imparting agent and the active material. In this case, a Henschel mixer having a high-speed-rotation blade in a cylindrical container, a two-arm kneader having a Σ type rotation blade, a paddle mixer with a fan-shaped paddle rotating around its axis, or the like is preferably used to generate stronger stirring force. For uniform dispersion, the particulate rubber is also preferably added in portions.

When the particulate thermoplastic elastomer is used, mixing is preferably performed at or lower than a temperature of the melting point of the particulate thermoplastic elastomer, more preferably at a temperature at least 20° C. lower than the melting point of the particulate thermoplastic elastomer. At a temperature higher than the melting point of the thermoplastic elastomer, the active material and the electroconductivity-imparting agent can tend to coalesce. The resulting mixture is dried using a vacuum dryer, a flash dryer or the like and optionally pulverized to give the powdered mixture D.

The powdered mixture generally has an average particle diameter of 10 to 200 μm, preferably of 15 to 70 μm, more preferably of 20 to 50 μm.

(2) Feeding, Leveling, and Heat-Melting of Powdered Mixture

In the manufacturing method of the invention, after the mixing process, the powdered mixture D may be metered and supplied onto the collector E using the feeder 7. Alternatively, the powdered mixture D may be supplied onto the collector E by a spraying method or electrostatically attached by an electrostatic spraying method, an electrostatic-fluidization dip coating method or the like. The feeder 7 may be a circle feeder, a screw feeder, a rotary feeder, an air blow feeder, a vibrating feeder, or the like. The surface of the fed powder is preferably leveled off with a blade, a roll, or the like such that the resulting electrode can have a uniform thickness.

In the invention, the powdered mixture D from the feeder 7 is fed onto the collector E, allowed to have a smooth surface, and then formed into an electrode layer on the collector by heating. The heating temperature may be a temperature equal to or higher than the melting point (Tm) of the binder or the glass transition temperature (Tg) of the binder, preferably a temperature at least 10° C. higher than Tm or Tg. If necessary, the electrode layer formed by the heat treatment may be roll-pressed under heating or after heating.

(3) Application of Electrically Conductive Adhesive to Collector and Drying of It In the invention, a metal foil is preferably used as the collector. Specifically, an aluminum foil is preferably used for electric double layer capacitors or positive electrodes of lithium-ion secondary batteries, and a copper foil is preferably used for negative electrodes of lithium-ion secondary batteries. When used for electric double layer capacitors, the collector is preferably precoated with the electrically conductive adhesive C for the purpose of reducing the internal resistance between the electrode and the collector (see FIG. 1, step S10). The electrically conductive adhesive C to be applied to the collector in advance may be produced by kneading the electroconductivity-imparting agent such as acetylene black, ketjen black and carbon black with the above particulate rubber and the dispersing agent in water or an organic solvent. Specifically, the electrically conductive adhesive C may be produced by mixing 5 to 40 parts by weight of the particulate rubber with 100 parts by weight of the electroconductivity-imparting agent such as acetylene black, ketjen black and carbon black in a kneader having a shearing function (see FIG. 1, step S8).

If the amount of the particulate rubber used in the production of the electrically conductive adhesive C is too small, adhesion between the resulting electrode and the collector can be insufficient. If the amount of the particulate rubber is too large, the electroconductivity-imparting agent can be insufficiently dispersed so that the internal resistance can be high.

The kneader for use in the production of the electrically conductive adhesive C may be a ball mill, a sand mill, a pigment-dispersing machine, a chaser mill, an ultrasonic dispersing machine, a homogenizer, a planetary mixer, or the like.

The electrically conductive adhesive C may be applied to the collector by any method including a doctor blade method, a dip method, a reverse roll method, a direct roll method, a gravure method, an extrusion method, a brush painting method, and the like. While the adhesive may be applied in any amount, the amount of application may be adjusted such that the resulting electrically conductive layer after drying can generally have a thickness of 0.5 to 10 μm, preferably of 2 to 7 μm.

The electrically conductive adhesive C applied as described above may be dried by any drying method in a heat-drying apparatus 5 (see FIG. 2). Examples of the drying method include warm air drying, hot air drying, low humidity air drying, and drying by application of (far) infrared rays, electron beams, or the like. The drying conditions may be adjusted such that the liquid medium can be removed as soon as possible, as far as the electrically conductive adhesive layer does not crack by stress concentration or does not come off from the collector.

In the manufacturing method of the invention, the powdered mixture D comprising the binder and the active material and optionally the electroconductivity-imparting agent is fed onto the collector and heated and optionally press-formed so that electrodes can be produced with no influence of changes in electrode paste viscosity in contrast to the conventional methods and thus uniform electrodes can be produced.

According to the invention, the powdered mixture D comprising the binder and the active material and optionally the electroconductivity-imparting agent is fed onto the collector, allowed to have an even surface, and then heated and optionally pressed to form an electrode. According to the invention, therefore, the electrode production can be continuously performed, and thus manufacturing methods suitable for mass production can be provided.

EXAMPLES

The invention is further described by means of the examples below, which are not intended to limit the scope of the invention. In the examples, "parts or part" and "%" are by weight, unless otherwise stated. The particle diameter of each of the particulate rubber and the thermoplastic elastomer for use as the binder is determined as a number-average particle diameter by measuring the diameters of randomly selected 100 polymer particles with transmission electron micrographs and calculating their arithmetical mean.

<Measurement Methods>

(1) Electrode Density

An electrode sheet for capacitor of 5×5 cm was taken by cutting and measured for weight and thickness. The weight and thickness of the collector were subtracted from the measured weight and thickness, respectively, when the density of the electrode layer (g/cm$^3$) was calculated.

(2) Peel Strength of Electrode

A 100 mm-long 25 mm-wide rectangle test piece of an electrode sheet for capacitor was taken by cutting and fixed with its electrode layer surface facing upward. After a cellophane tape was stuck on the electrode layer surface of the test piece, one end of the cellophane tape was pulled and peeled off at a pulling rate of 50 mm/minute in a vertical direction, while stress was measured. The measurement was performed three times, and the average value was calculated as the peel strength. Greater peel strength means greater adhesion of the electrode layer to the collector.

(3) Capacitance and Internal Resistance of Electric Double Layer Capacitor

An electric double layer capacitor was charged at 25° C. for 10 minutes to 2.7V at a constant current of 10 mA and then discharged to 0V at a constant current of 1 mA. Its capacitance was determined from the resulting charge/discharge curve, and the capacitance per unit weight of the electrode layer was calculated by subtracting the weight of the collector from the weight of the electrode and dividing the capacitance by the calculated weight of the electrode layer. Its internal resistance was determined from the charge/discharge curve by the calculation method according to Japan Electronics and Information Technology industries Association Standard No. RC-2377.

<Preparation of Particulate Thermoplastic Elastomer A>

To a stainless-steel autoclave was added 2500 parts of purified water, and 25 parts of a suspending agent of polyvinyl alcohol was dissolved therein. Thereto was added 700 parts of a backbone polymer of an ethylene/ethyl acrylate copolymer (15% by mole of the ethyl acrylate unit) and dispersed by stirring. Separately, 1.5 parts of benzoyl peroxide and 6 parts of tert-butylperoxymethacryloyloxyethyl carbonate were dissolved in a graft monomer mixture of 220 parts of methyl methacrylate and 80 parts of acrylonitrile, and the resulting monomer mixture was added to the autoclave and stirred. The autoclave was then heated to 60° C., and stirring was performed for 2 hours. Thereafter, the temperature was raised to 80° C., and stirring was continued for 7 hours so that polymerization was completed and a mixture of the backbone polymer and the branch polymer was obtained. The resulting polymer mixture was washed with water and dried, and then kneaded at 180° C. for 10 minutes at a rotation speed of 50 $min^{-1}$ (50 rpm) in a laboplast mill (B-75 manufactured by Toyo Seiki Seisaku-sho, Ltd.) to give a graft polymer.

Ten parts of the resulting graft polymer and 90 parts of N-methylpyrrolidone were mixed and heated at 140° C. to form a polymer solution. The solution was then cooled to room temperature under stirring so that particulate polymer was precipitated to form a 10% polymer dispersion. The polymer dispersion was spray-dried to give particulate thermoplastic elastomer A (0.05 μm in particle diameter).

<Preparation of Electroconductivity-Imparting Agent Dispersion B>

In a kneader, 100 parts of acetylene black and 40 parts of an aqueous solution of 10% carboxymethylcellulose (Cellogen 7A manufactured by Dai-ichi Kogyo Seiyaku Co., Ltd.) were kneaded, and the resulting mixture was diluted with water to give electroconductivity-imparting agent dispersion B.

<Preparation of Electrically Conductive Adhesive C>

One hundred parts of acetylene black, 20 parts of an aqueous solution of 10% carboxymethylcellulose (Cellogen 7A manufactured by Dai-ichi Kogyo Seiyaku Co., Ltd.), 50 parts of carboxy-modified styrene/butadiene copolymer latex with a solids content of 40% (BM-400B with a particle diameter of 0.12 μm manufactured by ZEON Corporation), and 10.2 parts of soft water were kneaded in a kneader and then diluted with soft water to give electrically conductive adhesive C with a solids content of 30% in which acetylene black had an average particle diameter of 0.5 μm when measured by light-scattering method.

Example 1

In a kneader, 75 parts of a high-purity activated carbon powder with a specific surface area of 1500 $m^2/g$ and an average particle diameter of 10 μm, 16.7 parts of electroconductivity-imparting agent dispersion B, 12.5 parts of particulate rubber of 40% carboxy-modified styrene/butadiene copolymer latex (BM-400B), and 2 parts of particulate thermoplastic elastomer A were kneaded, and then dried under reduced pressure to be powdered. The resulting powdered mixture had an average particle diameter of 15 μm. After drying, electrically conductive adhesive C was applied with a thickness of 5 μm to the collector. The powdered mixture was spread onto the adhesive-coated collector using a screw feeder and allowed to pass through a roll to have an even surface (at a collector sheet feeding speed of 4 m/minute). The collector with the spread powdered mixture was then heated to 200° C. so that the thermoplastic elastomer was melted. Thereafter, the collector with the mixture was roll-pressed to give a capacitor electrode sheet with an electrode thickness of 300 μm.

The forming of the electrode sheet was continuously performed for 20 minutes, and it was demonstrated that a long capacitor electrode sheet was stably formed.

Two 4 cm×height 6 cm pieces each with a lead terminal portion were cut from the capacitor electrode sheet. The electrode faces of the two pieces of the capacitor electrode sheet were opposed, and a 25 μm-thick polyethylene separator was sandwiched between them. The assembly was held between two pieces of 2 mm-thick, 5 cm-wide, 7 cm-high polypropylene sheet to form a device.

A solution of 1.5 mol/L triethylmonomethylammonium tetrafluoroborate in propylene carbonate was used as a liquid electrolyte. The device was heated under vacuum at 200° C. for 3 hours so that impurities such as water were removed from the device. Thereafter, the device was vacuum-impregnated with the liquid electrolyte, and held in the polypropylene container to form an electric double layer capacitor. The DC resistance and capacitance of the capacitor were measured at a current density of 20 $mA/cm^2$, and the capacitance per unit weight of the electrode layer (capacitance density) and the volume resistance were calculated, which showed good capacitor performance. Table 1 shows the results of evaluation of the respective characteristics of the resulting electrode sheet and electric double layer capacitor.

Example 2

A capacitor electrode sheet and an electric double layer capacitor were prepared and subjected to measurement using the process of Example 1 except that 12.5 parts of particulate rubber of 40% acrylate latex (composition: 2-ethylhexyl acrylate/acrylonitrile/methacrylic acid/ethylene glycol dimethacrylate=81/15/3/1 with a particle diameter of 0.15 μm) and 5 parts of particulate thermoplastic elastomer A were alternatively used. It was demonstrated that a long capacitor electrode sheet was stably formed and that the capacitor had good performance. The results are shown in Table 1.

Example 3

A capacitor electrode sheet and an electric double layer capacitor were prepared and subjected to measurement using the process of Example 2 except that 16.7 parts of a polymer dispersion (with a particle diameter of 0.20 μm and a solids content of 30%) was used as the particulate rubber, wherein the polymer dispersion was produced by emulsion polymerization of a monomer mixture of 74 parts of butyl acrylate, 25 parts of methyl methacrylate and 1 part of ethylene glycol dimethacrylate in the presence of 5 parts of polyvinyl alcohol. It was demonstrated that a long capacitor electrode sheet was stably formed and that the capacitor had good performance. The results are shown in Table 1.

Example 4

A capacitor electrode sheet and an electric double layer capacitor were prepared and subjected to measurement using the process of Example 1 except that particulate thermoplastic elastomer A was not used. It was demonstrated that a long capacitor electrode sheet was stably formed and that the capacitor had good performance. The results are shown in Table 1.

Comparative Example 1

Similarly to Example 1, 75 parts of the high-purity activated carbon powder, 16.7 parts of electroconductivity-imparting agent dispersion B, 12.5 parts of particulate rubber of 40% carboxy-modified styrene/butadiene copolymer latex (BM-400B), and 2 parts of particulate thermoplastic elastomer A were used, but in place of the powdered mixture of Example 1 produced by heat-drying the materials, an electrode-forming slurry with a solids content of 40% was prepared by kneading the materials with a planetary mixer and adding water thereto. The electrode-forming slurry was applied onto the collector treated with electrically conductive adhesive C and dried at 200° C. Thereafter, an electric double layer capacitor was prepared and subjected to evaluation using the process of Example 1.

The electrode-forming slurry prepared by the above method was placed in a glass beaker and stirred for 1 hour so that it lost fluidity. At that time, it had a solids content of 41%. Thus, it has been demonstrated that when such a carbonaceous material with a large specific surface area is used, particularly when an activated carbon powder is used as an active material, the electrode-forming slurry can lose fluidity by a slight change in concentration to make continuous operation difficult.

TABLE 1

|  | Example 1 | Example 2 | Example 3 | Example 4 | Comparative Example 1 |
|---|---|---|---|---|---|
| Electrode Density (g/cm$^3$) | 0.55 | 0.56 | 0.55 | 0.54 | 0.53 |
| Peel Strength (N/cm) | 0.06 | 0.08 | 0.11 | 0.06 | 0.09 |
| Internal Resistance (ΩF) | 4.2 | 3.7 | 3.6 | 4.0 | 4.5 |
| Capacitance (F/g) | 55.6 | 57.3 | 56.5 | 56.2 | 55.2 |
| Continuous Sheet Formability | Good | Good | Good | Good | Poor |

INDUSTRIAL APPLICABILITY

As described above, according to the invention, there is provided a manufacturing method that allows continuous mass production of electrodes for electrochemical devices.

The invention claimed is:

1. A method of manufacturing an electrode for an electrochemical device, comprising the steps of:
   depositing a dry powdered mixture containing a binder and an active material onto an electrically conductive adhesive applied on a collector; and
   heating the dry powdered mixture to form an electrode layer on the collector;
   wherein:
   the binder contains at least one of particulate rubber and a particulate thermoplastic elastomer, and
   the electrically conductive adhesive is produced by mixing 5 to 40 parts by weight of particulate rubber with 100 parts by weight of an electro conductivity-imparting agent.

2. The method according to claim 1, wherein an electrically conductive layer formed by drying the electrically conductive adhesive has a thickness of 0.5 to 10 μm.

3. The method according to claim 1, wherein the binder is used in a total amount of 0.1 to 50 parts by weight in order to form 100 parts by weight of the powdered mixture, the heating temperature is equal to or higher than the melting point of the binder or the glass transition temperature of the binder, and the electrochemical device is an electric double layer capacitor.

4. The method according to claim 1, wherein the electrochemical device is an electric double layer capacitor, and the active material is a carbonaceous material.

5. The method according to claim 1, wherein the dry powdered mixture contains 0.1 to 50 parts by mass of the binder, based on 100 parts by mass of the dry powdered mixture.

6. The method according to claim 1, wherein the thermoplastic elastomer is a graft polymer, said graft polymer comprising a radical-polymerizable monomer graft polymerized onto an ethylene/acrylic ester copolymer or methacrylic ester copolymer.

7. The method according to claim 1, wherein the binder is of a particulate form and has a particle diameter of 0.01 to 10 μm.

8. The method according to claim 1, wherein the deposited dry powdered mixture is pressed at or after the step of heating.

9. The method according to claim 1, wherein the active material has a specific surface area of at least 30 m$^2$/g.

10. The method according to claim 1, wherein the active material has a particle diameter of 0.1 to 100 μm.

11. The method according to claim 1, wherein the particulate rubber comprises particulate diene rubber or particulate acrylic rubber.

12. The method according to claim 1, wherein the particulate rubber has a particle diameter of 0.05 to 1 μm.

13. The method according to claim 1, wherein the particulate thermoplastic elastomer has a particle diameter of 0.02 to 5.0 μm.

14. The method according to claim 1, wherein the powdered mixture has an average particle diameter of 10 to 200 μm.

15. The method according to claim 1, wherein the heating temperature is equal to or higher than the melting point of the binder or the glass transition temperature of the binder.

16. The method according to claim 1, wherein the dry powdered mixture further contains an electro conductivity-imparting agent.

17. The method according to claim 16, wherein the active material and the electro conductivity-imparting agent in the dry powdered mixture are used in an amount of 50 to 99.9 parts by weight to form 100 parts by weight of the powdered mixture.

18. The method according to claim 16, wherein 0.1 to 20 parts by weight of the electro conductivity-imparting agent are blended with 100 parts by weight of the active material.

19. The method according to claim 1, wherein the binder contains both particulate rubber and a particulate thermoplastic elastomer.

20. The method according to claim 19, wherein a blend ratio of the particulate rubber/particulate thermoplastic elastomer is from 1/10 to 10/1.

* * * * *